Patented July 14, 1936

2,047,426

UNITED STATES PATENT OFFICE 2,047,426

COMPOSITION FOR COLORING AND WATERPROOFING CONCRETE AND THE LIKE

Frederick E. Miller, Cleveland Heights, Ohio

No Drawing. Application April 1, 1935,
Serial No. 14,128

5 Claims. (Cl. 134—78.5)

This invention relates to a method of and composition for coloring and waterproofing concrete, brick, cement, masonry, wood, or other porous materials of like nature.

Difficulties have been met with in producing a method or composition by the surface application of which concrete or cement structures or the like can be colored, stained or waterproofed. For instance, ordinary cement paint known to the trade, will not form a waterproof coating probably because of the highly porous nature of the mass, but water applied to the surface will penetrate or soak in the mass, with obviously objectionable results. But I have discovered that by the use of the method and composition hereinafter disclosed a color suspension may be obtained which will impregnate and waterproof natural or artificial stone, brick, cement, plaster and many other porous materials.

I make use of the great penetrating powers into these materials of benzol, toluol, zylol or similar aromatic hydrocarbons. These substances in themselves are not solvents of the dyes or pigments I prefer using, but I have discovered and make use of the fact that it is possible to dissolve a dye or other coloring substance in an alcohol, such for example as ordinary methyl alcohol, which may then be mixed with benzol, zylol, toluol or the like.

The dye or color dissolved in the alcohol will not disperse in the aromatic solvents, but upon the addition to the solution of relatively small amounts (say one percent by volume of coal tar, asphalt or other bituminous substances, the color is dispersed in the aromatic solvent. When then applied to the porous surface the aromatic solvent will penetrate carrying the coloring matter with it to a considerable depth, and it is deposited uniformly and evenly. At the same time it may be combined as hereinafter stated to form a waterproof coating which will prevent the penetration of water or dampness.

As a modification I have discovered another method for dispersing dyes normally insoluble in benzol, toluol, zylol or the like which consists in first putting the dye into solution in one of the glycols, such as diethylene glycol or the esters and ethers such as diethylene glycol mono-ethyl ether, and then diluting it with one of the aromatic solvents above mentioned. The dye will disperse evenly throughout the whole mixture, which may be used in a similar manner for coloring the porous surfaces of the materials above mentioned.

The amount of dye to be used will depend upon the depth or tint of color desired; the amount of alcohol or glycol to be used will vary between 5 percent and 10 percent of the volume of the aromatic solvent.

In order to waterproof the surface to be treated it is only necessary to add to the composition one of the heavy metal soaps such as aluminum or calcium stearate, in addition to the compositions above shown. The benzol or other aromatic hydrocarbon serves to carry the color and the heavy metal soap into the pores of the material being treated, depositing it both uniformly and evenly and forming a waterproof coating or impregnation of the material.

The invention is not limited to the particular materials or propositions specified but may be varied within the following claims.

I claim:

1. A composition for coloring porous cementitious material, comprising a dye dissolved in alcohol and mixed with an aromatic hydrocarbon and bituminous dispersing material.

2. A composition for coloring porous concrete or the like, comprising a dye dissolved in alcohol and mixed with toluol or the like and a small amount of bituminous substance such as coal tar or asphalt.

3. The method of making a coloring composition for concrete or the like, comprising dissolving a dye in an alcohol, mixing the same with an aromatic hydrocarbon, and adding sufficient bituminous substance to the mixture to disperse the dye in the composition.

4. The method as in claim 3, the hydrocarbon including toluol and the bituminous substance including coal tar.

5. A composition for coloring and waterproofing porous material, comprising a dye dissolved in an alcohol and mixed with an aromatic hydrocarbon, a bituminous dispersing substance and a heavy metal soap.

FREDERICK E. MILLER.